United States Patent [19]

Stregack et al.

[11] 4,136,317

[45] Jan. 23, 1979

[54] 14 AND 16 MICRON, OPTICALLY PUMPED, GAS DYNAMIC $CO_2$ LASER

[75] Inventors: Joseph A. Stregack, Silver Spring; Thomas J. Manuccia, Laurel, both of Md.

[73] Assignee: The United States of America as represented by the Secretary of the Navy, Washington, D.C.

[21] Appl. No.: 787,115

[22] Filed: Apr. 13, 1977

[51] Int. Cl.² .................................................. H01S 3/09
[52] U.S. Cl. ............................ 331/94.5 G; 331/94.5 P
[58] Field of Search ..................... 331/94.5 P, 94.5 G, 331/94.5 DE

[56] References Cited

U.S. PATENT DOCUMENTS 4,053,851  10/1977  Krupke ........................... 331/94.5 G

OTHER PUBLICATIONS

Stregack, et al., *Applied Physics Letters*, vol. 27, No. 12, Dec. 15, 1975, pp. 670–671.
Osgood, Jr., *Applied Physics Letters*, vol. 28, No. 6, Mar. 15, 1976, pp. 342–345.
Manuccia et al., *Applied Physics Letters*, vol. 29, No. 6, Sep. 15, 1976, pp. 360–362.

*Primary Examiner*—William L. Sikes
*Attorney, Agent, or Firm*—R. S. Sciascia; Philip Schneider; Melvin L. Crane

[57] ABSTRACT

An electric discharge gas-dynamic laser (EDGDL) providing laser action in $CO_2$ at 16 microns between the (02°0) and (01'0) levels as well as between the (10°0) and (01'0) levels at 14 microns. A $9\mu$ or $10\mu$ saturating pulse equilibrates the (001) level with either the (02°0) or (10°0) level and creates the $14\mu$ or $16\mu$ inversion. Extraction efficiencies of 50% have been achieved. Repetition frequencies of 200Hz have been achieved using a repetitively Q-switched cavity.

1 Claim, 4 Drawing Figures

14 AND 16 MICRON, OPTICALLY PUMPED, GAS DYNAMIC $CO_2$ LASER

BACKGROUND OF THE INVENTION

This invention relates to an electric discharge gas-dynamic laser and more particularly to an EDGDL operating on the $16\mu$, $(02°0)-(01'0)$, and the $14\mu$, $(100)-(01'0)$, transitions of $^{12}CO_2$.

Heretofore EDGDL have been set forth in "CWCO-$CS_2$, $CO-C_2H_2$ and $CO-N_2O$ energy transfer lasers", by J. A. Stregack, B. L. Wexler and G. A. Hart in *Applied Physics Letters*, Vol. 28, No. 3, Feb. 1, 1976, pps 137–139, and "$D_2-CO_2$ and $D_2-N_2O$ electric discharge gas-dynamic lasers", by J. A. Stregack, B. L. Wexler and G. A. Hart in *Applied Physics Letters*, Vol. 27, No. 12, Dec. 15, 1975, pps 670–671.

The gas-dynamic laser and in particular, the electric discharge gas-dynamic laser (EDGDL) are established methods for the production of non-equilibrium states of a gas which are suitable for lasing. A gas in such a condition typically has one or more vibrational modes at a very high effective temperature, which other modes as well as the translational and rotational degrees of freedom are at very low temperatures. Lasing is possible in the hot modes, or between hot and cold modes, but the numerous desirable laser transitions in the cold modes remain inaccessible.

Optical pumping of molecular species is an even more selective technique for populating selected states of a molecule and has been used to produce IR and far-IR lasers. Optical pumping by itself has some fundamental limitations. Only states coupled to the ground state by IR-active transitions are accessible unless the gas is heated. Unfortunately, simple heating carries the danger of populating the lower laser level of the desired transition. Direct optical pumping is at best a one-for-one process: every pump photon absorbed will produce at most one lower-energy lasing photon, even in the absence of all relaxation and other processes. Thus, the pumped laser is only as scalable as the pumping laser.

The optically pumped gas-dynamic (OPGDL) laser has all the advantages of these two approaches, but many of the individual limitations of each technique are not present when combined. States not accessible by either approach individually can now be excited with a high degree of selectivity using the combined methods. Scalability of the pumping laser is not as severe a problem; in general, the thermal or electrical input to the GDL will provide the bulk of the energy. In the special case where the upper laser level of the OPGDL is unexcited by the GDL and is below the vibrational levels excited by the GDL, no photons are absorbed in the pumping process; rather, stimulated emission takes place and the pumping beam is amplified. Efficiency for pumping $CO_2$ (001) in a GDL can be very high, promising high overall efficiencies.

SUMMARY OF THE INVENTION

In this invention an intense saturating pulse of 9 or 10 micron radiation is used to populate the (100) or (020) levels from the previously excited (001) molecules, creating an inversion with respect to the (01'0) level.

In this device, the diatomic constituent of the primary flow (either a $N_2$-He mixture or a $D_2$-Ar mixture) is vibrationally excited by a glow discharge in the subsonic plenum. The gas is then accelerated through an array of supersonic nozzles where the $CO_2$ is injected. Mixing and energy transfer to the $CO_2$ occur in the supersonic region. The device will also function using a premixed flow of all the gases through the plenum. In this laser system $T_{001} > 1800°$ K. and $T_{trans} < 200°$ K. have been measured up to 25 cm downstream of the nozzle exit plane. This implies that prior to the saturating pulse, the $(01'0)$, $(02°0)$, and $(100)$ levels, each of which is strongly coupled to the translational temperature, contain less than 1% of the total $CO_2$ population while the (001) level contains about 13% of the total population. In principle, half of the latter is available as upper state population for the 14 or $16\mu$ transitions. It has been determined that saturation of the 9 or $10\mu$ transition in less than 100ns will produce $16\mu$ lasing for the above conditions. Lasers operating the $16\mu$ region of the infrared spectrum have application for uranium isotope enrichment. The laser of this invention has sufficient high power for the above purpose.

This system has been set forth in the following article: "14 and 16 Micron Gasdynomic $CO_2$ Laser", by T. J. Manuccia, J. A. Stregack, N. W. Harris, and B. L. Wexler, In *Applied Physics Letters*, Vol. 29, No. 6, Sept. 15, 1976, p. 360–362, which is incorporated herein by reference.

DETAILED DESCRIPTION

In carrying out this invention, an EDGDL is used to produce a 16 or $14\mu$ laser output. The details and operation of the EDGDL are shown and described in a co-pending patent application, Ser. No. 693,592, filed July 2, 1976, now U.S. Pat. No. 4,056,789 which is incorporated herein by reference.

Figure 1:
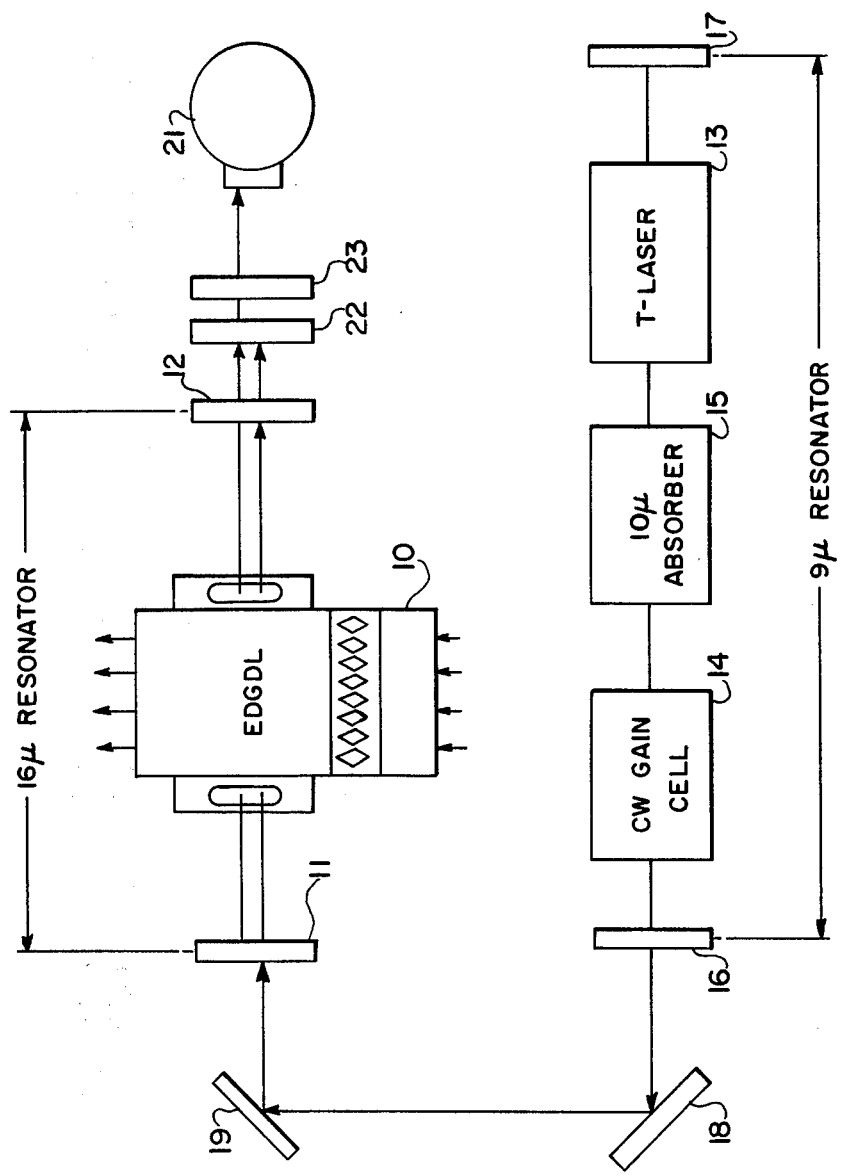
FIG. 1 is a schematic diagram of the laser system using an external saturating pulse.

As shown in FIG. 1, an EDGDL 10 is pumped by a 9 micron laser to produce a 16 micron output from the EDGDL. The 16 micron resonator includes an EDGDL 10 operating with a He-$N_2$-$CO_2$ mix or an Ar-$D_2$-$CO_2$ mix. Mirrors 11 and 12 complete the resonator. Mirror 11 is 50% transmissive at $9\mu$ but highly reflective, about 97%, at $16\mu$. Mirror 12 is highly reflective, about 97%, and the output beam is passed by mirror 12. The output may be extracted by an Au hole coupler or an uncoated Ge plate.

In order to create the inversion on the $16\mu$ band, several rotational lines of the $9\mu$ band produced by the EDGDL are quickly saturated by an external $9\mu$ laser pulse. Quick saturation results in extracting as much of the (001) stored energy as possible and allows higher peak $16\mu$ gains. The external source $9\mu$ laser comprises a $2 \times 2 \times 100$ cm double discharge $CO_2$ TEA laser cell 13, a 70 cm low-pressure continuous wave (cw) gain cell 14, and a 2 cm absorption cell 15 all in a common resonator. The absorption cell is filled with a mixture of $SF_6$ (500 Torr) and CC $1 F_3$ (50 Torr) in order to force oscillation on the P-branch of the $9\mu$ band. Partially reflective mirrors 16 and 17 complete the $9\mu$ resonator. Output radiation through mirror 16 is directed onto a 45° fully reflective element 18 which reflects the 9 micron radiation onto a second 45° fully reflective element 19 which reflects the 9 micron radiation into the 16 micron resonator through mirror 11. Mirror 11 is 50% transmissive at $9\mu$ but highly reflective at $16\mu$.

In operation, the desired gaseous mixture of $N_2$-He or $D_2$-Ar is admitted into the gaseous inlet end of the EDGDL where the diatomic constituent of the primary flow is vibrationally excited by a glow discharge in the subsonic plenum. The gas is then accelerated through the array of supersonic nozzles where the $CO_2$ is injected. Mixing and energy transfer to the $CO_2$ occur in the supersonic region to produce a 9 or $10\mu$ transition. Measurements of $T_{001} > 1800°$ K. and $T_{trans} < 200°$ K. have been obtained up to 25 cm downstream of the nozzle exit plane. The external $9\mu$ laser pulse then saturates the $9\mu$ transition in the EDGDL.

Prior to the saturating pulse, the (01'0), (02$^2$0), and (100) levels, each of which is strongly coupled to the translational temperature, contain less than 1% of the total $CO_2$ population while the (001) level contains about 13% of the total population. Thus, half of the latter is available as upper state population for the $16\mu$ transitions. It has been determined that saturation of the 9 or $10\mu$ transition in less than 100 ns is adequate to ensure $16\mu$ lasing for the above conditions.

In order to produce the inversion on the $16\mu$ band, several rotational lines of the $9\mu$ band are quickly saturated. This is desirable so as to extract as much of the (001) stored energy as possible and to allow higher peak $16\mu$ gains. With adjacent rotational levels of (02°0) being simultaneously populated, rotational relaxation does not compete with building substantial populations in a particular J-level of the upper state of the $16\mu$ transition. The CW gain cell in the external $9\mu$ resonator is operated below CW threshold to give a 50MHz wide excess gain peak at line center on each of the 1 GHz wide J-lines of the TEA cell. As the EDGDL operates at low pressures (5Torr), such matching of bandwidths is desirable for efficient coupling. The gain cell in the external $9\mu$ resonator is cooled to $-30°$ C. to further reduce the Doppler broadening and to better match the low-temperature rotational distribution of the EDGDL. The absorption cell in the $9\mu$ resonator is filled with a mixture of $SF_6$ (500 torr) and CC 1 $F_3$ (50 torr) in order to force oscillation on the P-branch of the $9\mu$ band. Small changes in the composition of the gases in the absorption cell and laser can be used to fine tune the cavity to give equal gain on a number of J-lines and ensure multiple line operation of this source. The combination of these components produces simultaneous lasing on eight transitions of the $9\mu$ band, four of which, P(14) to P(20) have over 200KW peak power. The rise time is less than 50 ns.

Figure 3:
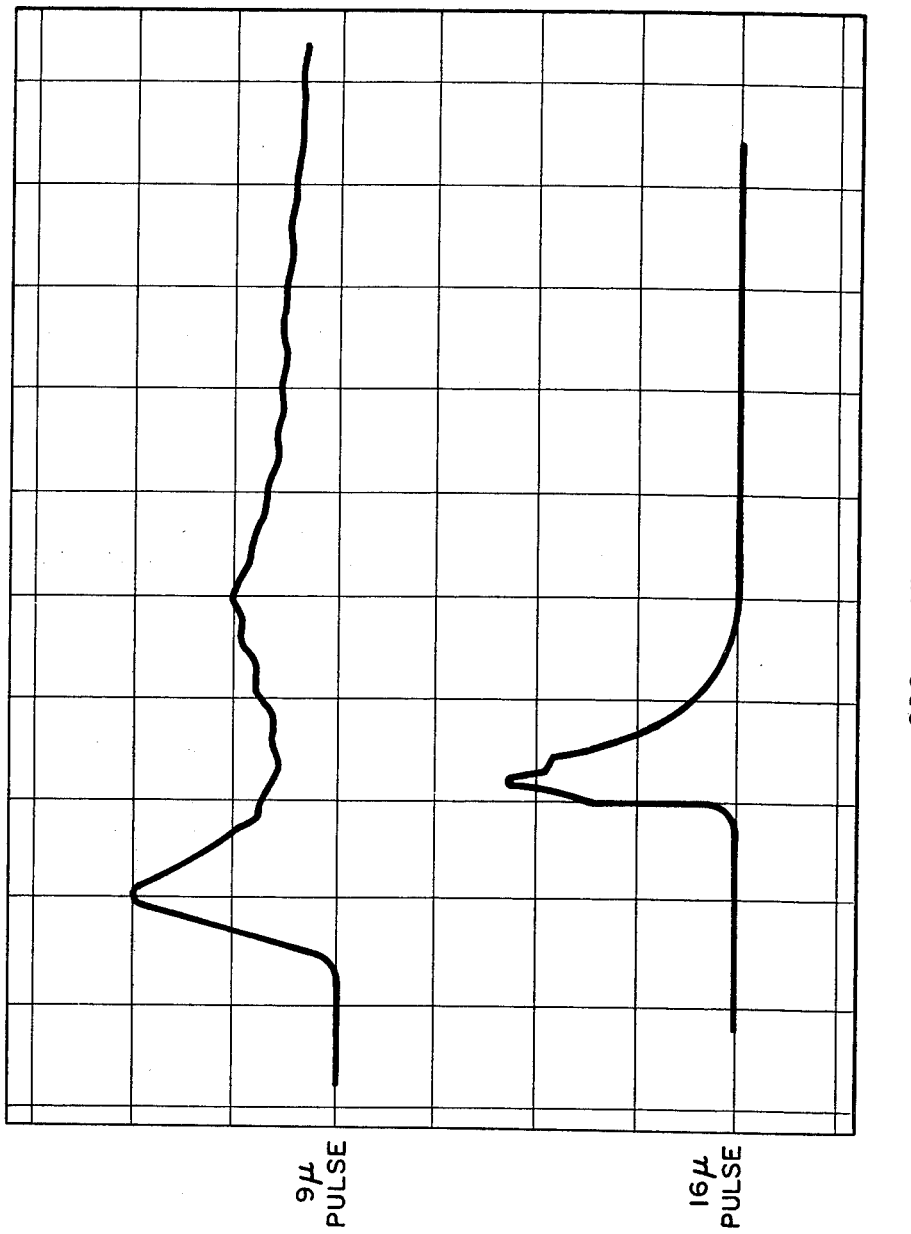
FIG. 3 illustrates $9\mu$ and $16\mu$ pulses.

The external saturating beam is introduced into the $16\mu$ cavity through a reflective element such as a mirror which is 50% transimissive at $9\mu$, but highly reflective ($\geq 97\%$) at $16\mu$. Output from the 25 cm long active region is extracted from either an identical mirror, an Au hole coupler, or an uncoated Ge plate. The $16\mu$ pulse has a 50 ns rise time and a 150 ns (full width, have maximum) rise time at 0.3 torr $CO_2$ in the EDGDL. A typical pulse is shown in FIG. 3. The laser output may be detected by the detector 21 shown, or put to beneficial use as desired. As shown, the detector is protected from the saturating pulse by two long-pass filters 22 and 23.

The largest $16\mu$ pulse and the smallest delays between pump pulses are obtained with the CW gain section of the $9\mu$ saturating pulse adjusted slightly below CW threshold. If the saturating laser is above CW threshold, $9\mu$ CW and pulsed output are confined to only one rotational transition, and the $16\mu$ output is reduced. With the CW section inoperative, $16\mu$ output is even further reduced. This is because, although several rotational lines lase simultaneously, each might be displaced by as much as several hundred megahertz from line center due to pressure broadening in the TEA-laser. Hence, the interaction of the saturating pulse with the cold, low-pressure $CO_2$ in the EDGDL is weakest in this case.

Figure 2:
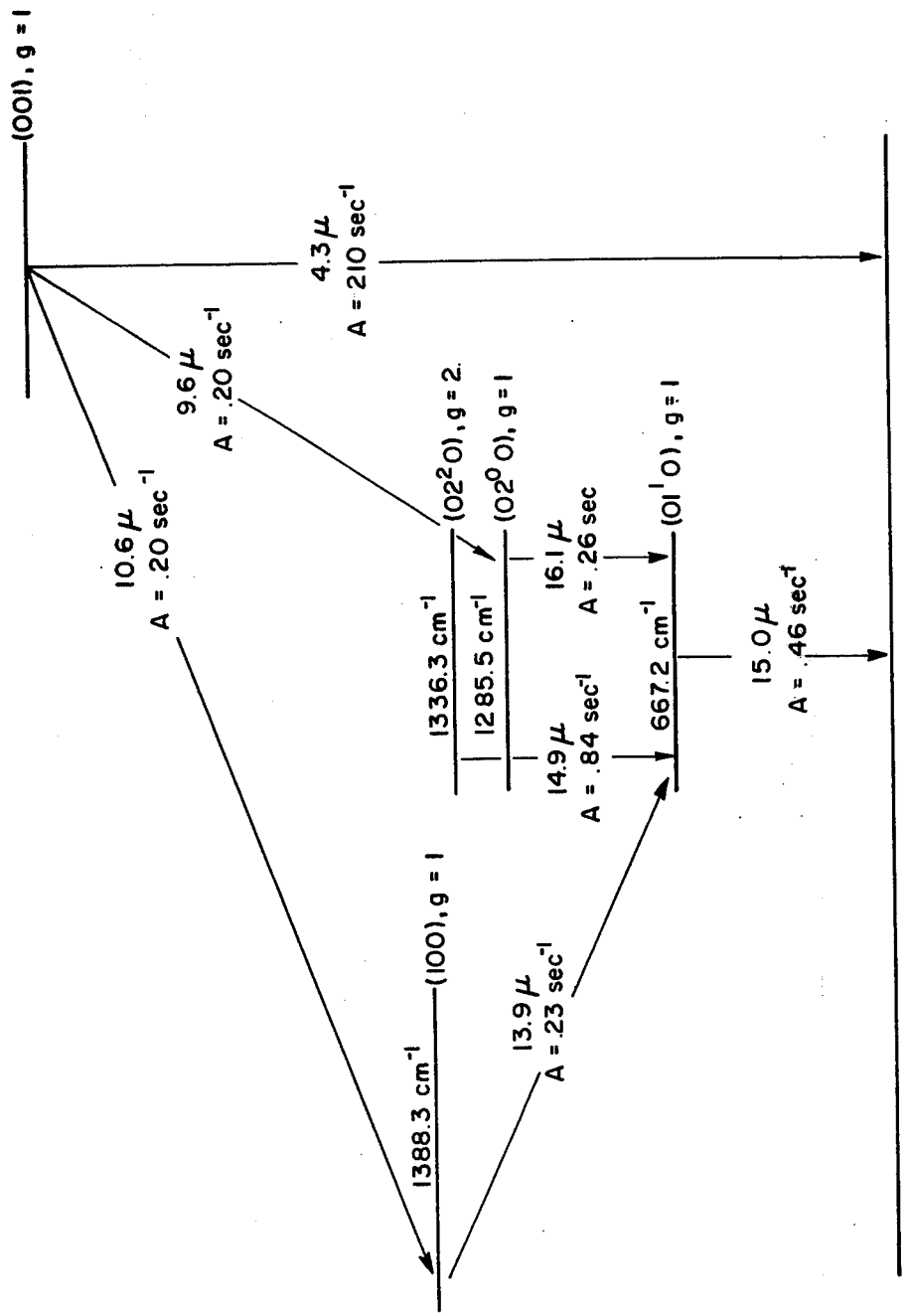
FIG. 2 illustrates the vibrational energy levels of the laser.

FIG. 2 represents a vibrational energy level for the $16\mu$ laser in which an intense saturating pulse of 9 or $10\mu$ radiation is used to populate the (100) or (200) levels from previously excited (001) molecules, creating a transient inversion with respect to the (01'0) level.

Figure 4:
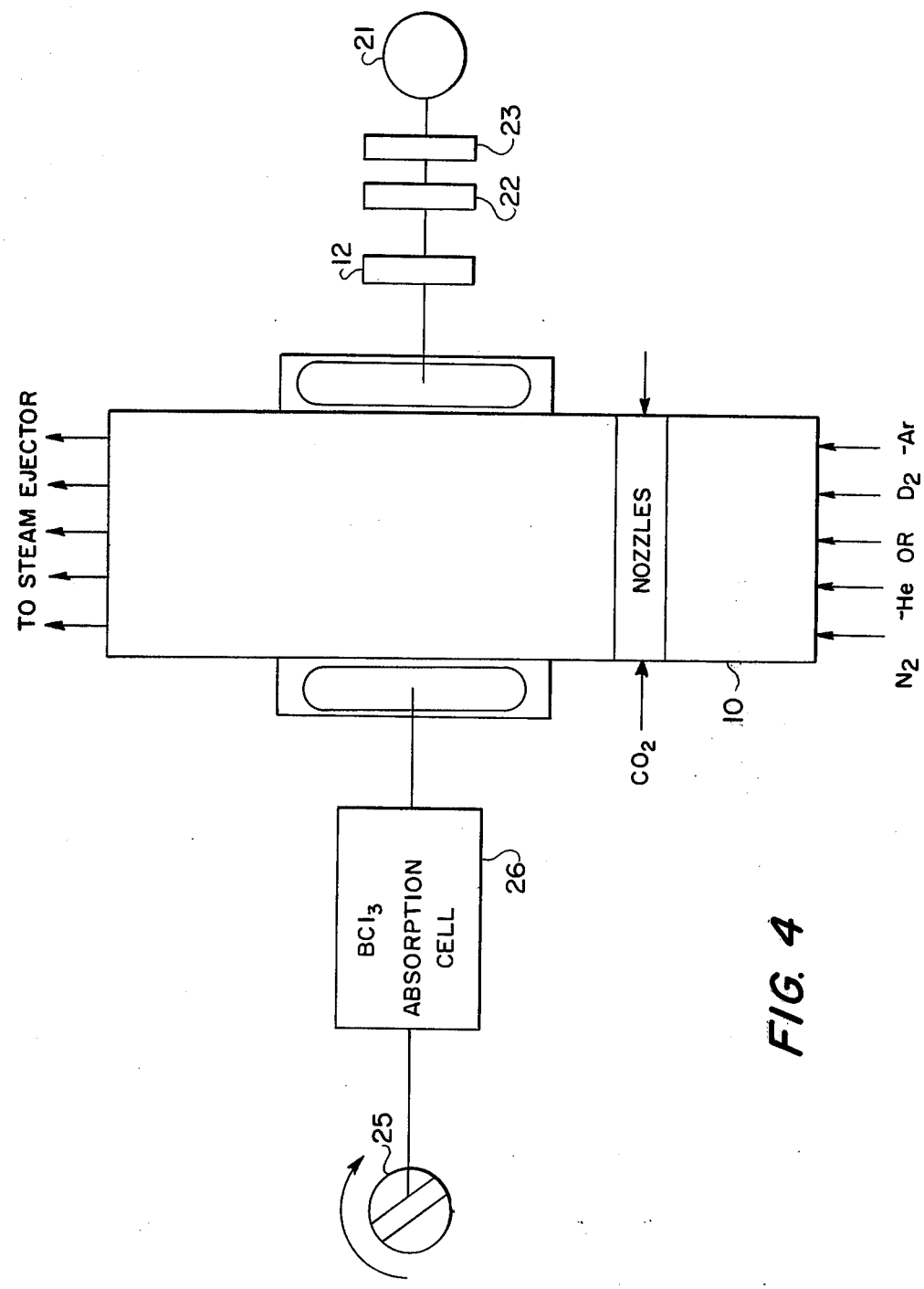
FIG. 4 is a schematic diagram of the laser system using a rotating mirror Q-switch to internally operate the saturating pulse.

FIG. 4 illustrates a cascade lasing system using an EDGDL such as shown in FIG. 1 but without the additional pumping laser. The system of FIG. 4 makes use of a rotating mirror Q-switch 25 which Q-switches the 9 or $10\mu$ transition produced in the EDGDL 10. While the mirror is still in alignment, a 16 or $14\mu$ gain-switched pulse is produced. An intra-cavity absorption cell 26 is filled with about 200 Torr of $BCl_3$ is used to force oscillation on the $9\mu$ band. The $BCl_3$ is transparent to the $16\mu$ radiation. The mirror rotates and when the mirror is in alignment with the optical axis of the EDGDL, a 16 or $14\mu$ gain switched output pulse is produced. Repetition rates of 200Hz have been produced with the above described system. The (001) population has been observed to decrease slowly with distance from the nozzle exit plane; therefore, tradeoffs between mode volume (pulse energy) and repetition rate should be possible. Since no $CO_2$ is actually passed through the glow discharge region, closed cycle operation of the device with isotopically substituted $CO_2$ should be feasible. Cascade lasing in the EDGDL with other polyatomic species such as $C_2H_2$ and $CS_2$ should be a useful technique for the production of many new, scalable mid-IR lasers.

In operation of the laser system shown in FIG. 4, the gases $N_2$-He or $D_2$-Ar and $CO_2$ are admitted in the same manner as that described above for the system shown in FIG. 1. It has been determined that the $CO_2$ can be mixed with the other gases during their admission and the same results may be obtained.

In the laser system illustrated in FIGS. 1 and 4, the normal laser output of the EDGDL of 9 or $10\mu$ transition is saturated to produce the $16\mu$ laser output. In the device of FIG. 1, the 9 or $10\mu$ transition saturating beam is produced by a separate external laser whose output is admitted into the EDGDL through a partially reflective mirror which is transparent to the 9 or $10\mu$ pump radiation but highly reflective at $16\mu$.

In the system illustrated by FIG. 4, the EDGDL laser is forced to perform two functions. The system first lases at 9 or $10\mu$ in its normal operation and then in cascade at $16\mu$. The rotating mirror Q-switches the 9 or $10\mu$ transition and while the mirror is still in alignment a $16\mu$ gain-switched pulse appears. As the mirror continues to rotate, the $16\mu$ pulse continues to build-up to produce the $16\mu$ output.

Laser action has been obtained between the (02°0) and (01'0) levels at 16 microns as well as between the (10°0) and (01'0) levels at 14 microns. A 9 or $10\mu$ saturating pulse equilibrates the (001) level with either the (02°0) or (10°0) level and creates the transient $14\mu$ or $16\mu$ inversion. Extraction efficiencies of 50% have been achieved on a single pulse and repetition frequencies of 200 Hz have been achieved using s single Q-switched cavity.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A 16 micron gas-dynamic $CO_2$ laser which comprises:

an electric discharge gas dynamic $CO_2$ laser;

means for pumping said $CO_2$ laser;

a $D_2$-$A_r$ vibrationally excitable gas mixture mixed with $CO_2$ in said laser to produce a $9\mu$ transition in said gas dynamic $CO_2$ laser resonant cavity; and means for saturation of said $9\mu$ transition in said gas dynamic $CO_2$ laser to ensure $16\mu$ lasing in said resonant cavity;

said means for saturation of said $9\mu$ transition in said gas dynamic $CO_2$ laser including a double discharge $CO_2$-TEA laser cell, a low-pressure continuous wave gain cell and an absorption cell in a common resonator.

* * * * *